US008117104B2

(12) United States Patent
Kothari

(10) Patent No.: US 8,117,104 B2
(45) Date of Patent: Feb. 14, 2012

(54) VIRTUAL ASSET GROUPS IN A COMPLIANCE MANAGEMENT SYSTEM

(75) Inventor: Pravin Kothari, San Jose, CA (US)

(73) Assignee: Agiliance, Inc., Sunnyvale, CA (US)

( * ) Notice: Subject to any disclaimer, the term of this patent is extended or adjusted under 35 U.S.C. 154(b) by 0 days.

(21) Appl. No.: 11/407,842

(22) Filed: Apr. 20, 2006

(65) Prior Publication Data
US 2007/0250424 A1    Oct. 25, 2007

(51) Int. Cl.
G06Q 40/00    (2006.01)
(52) U.S. Cl. ............ 705/35; 705/36; 705/38; 705/39; 705/44
(58) Field of Classification Search ............ 705/15–45
See application file for complete search history.

(56) References Cited

U.S. PATENT DOCUMENTS

| | | | |
|---|---|---|---|
| 6,204,844 B1 * | 3/2001 | Fumarolo et al. ............ 715/736 |
| 6,295,527 B1 * | 9/2001 | McCormack et al. ............ 707/3 |
| 6,477,387 B1 * | 11/2002 | Jackson et al. ............ 455/519 |
| 7,206,851 B2 * | 4/2007 | Delaney et al. ............ 709/229 |
| 7,644,089 B2 * | 1/2010 | Stewart et al. ............ 726/27 |
| 2002/0184068 A1 * | 12/2002 | Krishnan et al. ............ 705/8 |
| 2003/0065942 A1 * | 4/2003 | Lineman et al. ............ 713/201 |
| 2004/0015728 A1 * | 1/2004 | Cole et al. ............ 713/201 |
| 2004/0193918 A1 * | 9/2004 | Green et al. ............ 713/201 |
| 2005/0066021 A1 * | 3/2005 | Megley ............ 709/223 |
| 2005/0257267 A1 * | 11/2005 | Williams et al. ............ 726/25 |
| 2006/0095431 A1 * | 5/2006 | Nash ............ 707/7 |
| 2008/0262863 A1 * | 10/2008 | Stickley et al. ............ 705/1 |

OTHER PUBLICATIONS

"Breach Security and Applied Watch Team up on New IDS Appliance; New S-Series IDS Appliance Leverages Breach View SSL to Provide Encrypted Threat Protection for Large Commercial, Federal, and Military Organizations", Business Wire, New York: Feb. 21, 2006, p. 1.*

* cited by examiner

*Primary Examiner* — Ella Colbert
*Assistant Examiner* — Hai Tran
(74) *Attorney, Agent, or Firm* — Minisandram Law Firm; Raghunath S. Minisandram

(57) ABSTRACT

Embodiments of the present invention can be used to assign policies to assets and enforce the policies in a dynamic environment. In one embodiment, the present invention includes discovering a plurality of assets using a plurality of distributed software interfaces over a network, each asset being having a plurality of attributes. A user can input receiving a group filter criterion, which can then be used to create and display a plurality of virtual asset groups to the user, each virtual asset group containing representations of assets having the same attributes for the received group filter criterion. In one embodiment, the present invention provides the ability to apply policies directly to virtual asset groups, and the policies are applied to virtual asset group members dynamically.

22 Claims, 5 Drawing Sheets

VIRTUAL ASSET GROUPS IN A COMPLIANCE MANAGEMENT SYSTEM

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

1. Field

Embodiments of the present invention apply to the field of network security and regulatory compliance, more specifically compliance management.

2. Description of the Related Art

Modern business enterprises operate in a complex regulatory environment. Many enterprises must comply with various government regulations both on the federal level and on the state and local levels. For example, most public corporations (at the present time any publicly traded corporation with fifty million or more market capitalization) must comply with the Sarbanes-Oxley Act of 2002. Financial enterprises, heath related enterprises, and other more stringently regulated industries have their own regulatory frameworks.

Furthermore, many business enterprises have internal policies and controls independent of government regulation. These controls and policies may be concerned with security, confidentiality maintenance, trade secret protection, access control, best practices, accounting standards, business process policies, and other such internal rules and controls. The cost of complying with all regulations, rules, policies, and other requirements can be substantial for a large scale business enterprise.

Up until the present time, large scale business enterprises have mostly used outside consultants to assist with compliance. The costs of such consultants can be staggering. Moreover, different consultants use different systems and checks, making it difficult to switch consultants. Some rudimentary efforts have been made to automate some of the task of compliance. However, what is needed, in an integrated compliance management system that can address both present and future compliance needs and integrates into an enterprises existing network infrastructure.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Compliance Management System

Figure 1:
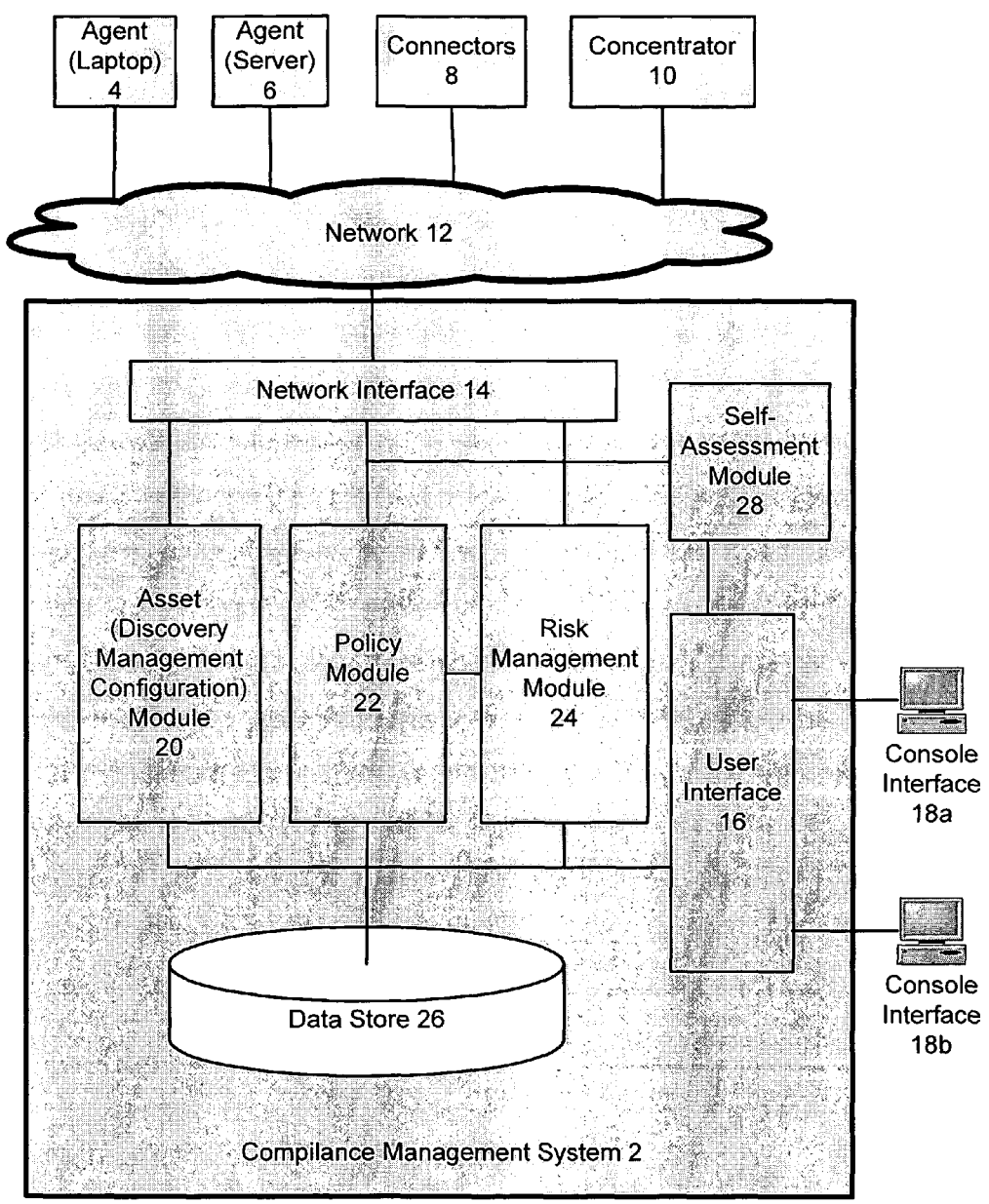
FIG. 1 is a block diagram illustrating a compliance management system according to one embodiment of the present invention.

One embodiment of the invention is now described with reference to FIG. 1. FIG. 1 shows a compliance management system 2. In one embodiment, the compliance management system 2 is provided as a stand-alone appliance that connects to a network, but the compliance management system 2 can be provided in other ways, such as software running on a server, distributed software, or various software and hardware packages operating together.

The compliance management system 2 connects to a network 12—such as an local area network (LAN), Intranet network segment, or the Internet—and can collect data from various sources. For example, the compliance management system 2 can collect data from agents 4 and 6. Agent 4 is an agent associated with and overseeing a laptop (in this example) and agent 6 is associated with a server. In a real-world embodiment, there could be thousands of agents associated with thousands of separate assets.

The compliance management system 2 can also collect information from various collectors 8. Collectors 8 can be custom designed connectors to connect to various network devices and network management and security products already installed by the enterprise. For example, the connectors 8 can enable the compliance management system 2 to connect to, and collect data from, routers, firewalls, directories (such as Microsoft's Active Directory), vulnerability scanners, security information management (SIM) products, enterprise risk management (ERM) products and other such products and applications. Also, some deployments of the compliance management system 2 may not use distributed agents at all, in which case information regarding various assets can be collected via an agent-less concentrator (also referred to sometimes as an aggregator) 10.

In one embodiment, the compliance management system 2 implements asset discovery, configuration, and management functionalities. Such functionality can be provided in the asset module 20 shown in FIG. 1. In one embodiment, the asset module interfaces with the various agents, connectors, and concentrators 2-10 (referred to collectively as "software interfaces" or "distributed software interfaces" for simplicity) via the network interface 14 that connects the compliance management system 2 to the network 12. The asset module 20 performs asset discovery by collecting information about all assets connected to and/or visible to the network 12. Such assets can include, but are not limited to, laptops, desktops, workstations, operating systems and other applications, servers, users, routers, intrusions detection devices (IDS), firewalls, printers, and storage systems. Assets can be imported from various connected applications, such as vulnerability scanners, directory applications, ERM, SIM, and other security-related products, and so on.

In one embodiment, the asset module 20 can also be used to configure asset attributes. This can be done by an operator of the compliance management system 2 via the user interface 16 exposed to the user by consoles 18a and 18b. There may be more or less consoles, which will be collectively referred to as console interface 18.

For example, an agent can report a newly discovered laptop computer. The agent can automatically report back on electrically available attributes, such as central processing unity (CPU) type, the operating system running on the laptop, the types of memory installed, and so on. A user (typically a system administrator) can then add extra attributes to the laptop, such as business owner, business classification, group, and other similar attributes.

The discovered and configured assets can be stored, in one embodiment, in data store 26. Data store 26 can be implemented as a disk, a data server, or some other physical storage means. It can reside inside or outside of the compliance management system 2. The data store 26 can include various databases. One such database can be an asset database, having records corresponding with managed assets. The assets discovered and stored in the asset database can be managed, in one embodiment, from the console interface 18 by editing various attributes of the assets.

In one embodiment, policy compliance functionality is provided by the system 2 by implementing a policy module 22. The policy module 22 can enable a user—via the user interface 16—to author and edit policies and policy templates and apply policies to various assets. The policy module 22 also maintains a policy database in the data store 22. In one embodiment, policies can also be labeled, grouped and organized according to certain predefined roles for personnel. For example, "engineer level 1" can be a role that has a list of specific policies associated with it.

In one embodiment, the compliance management system 2 also provides risk management functionality by implementing a risk management module 24. The risk assessment module 24 analyzes multiple sources of information, including the compliance management system 2, to determine the risk the enterprise is exposed to. In one embodiment, the risk management module collects information—in addition to the compliance management system—from the enterprise's vulnerability assessment systems, SIM systems, asset configurations, and network traffic reports. Other sources of information may be used as well. In one embodiment, the risk management module determines a simple metric to express the enterprise's risk profile using all the collected information.

Figure 2:
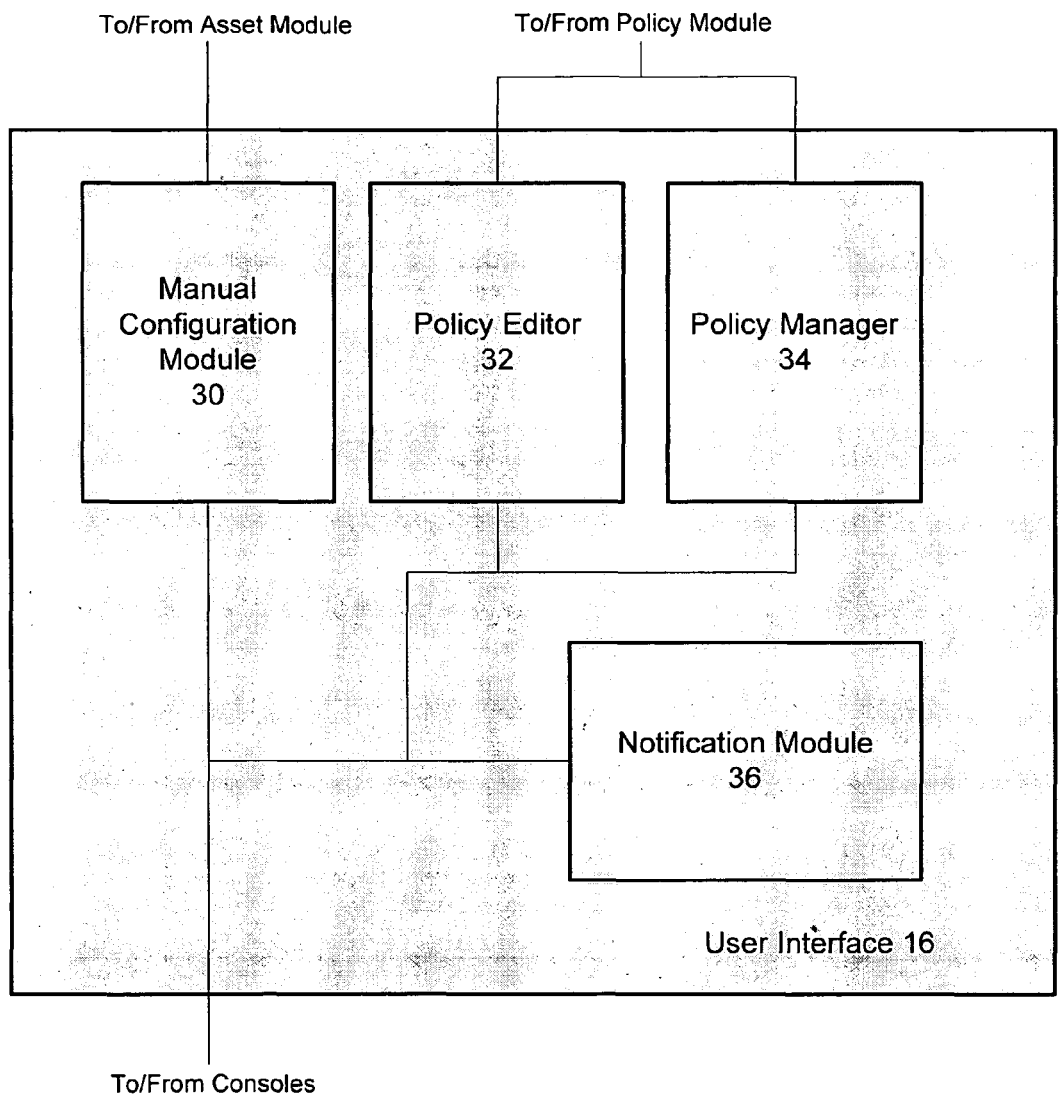
FIG. 2 is a block diagram illustrating a user interface module for a compliance management system according to one embodiment of the present invention.

As mentioned above, the compliance management system 2 also includes a user interface 16 which is exposed to users of the system 2 by consoles 18. In one embodiment the consoles 18 are browser-based, allowing for administration and use of the system 2 from any network-attached work station, or through a remote network connection. In one embodiment, the user interface enables an administrator to select from a list of regulations—such as Sarbanes-Oxley (SOX), Gramm-Leach-Bliley Act (GLBA), Health Insurance Portability and Accountability Act (HIPPA), Card Holder Information Regulation Program (CISP)—and display functionality relevant to the selected regulation. Similarly, the user interface can enable an administrator to select from a list of standard frameworks—such as ISO-17799, Control Objectives for Information and related Technologies (COBIT)—and display functionality relevant to the selected regulation or framework. FIG. 2 provides a more detailed view of the user interface 16 according to one embodiment of the present invention.

The user interface 16 can implement a manual configuration module 30 that allows the user to manually configure asset attributes, as described in the example of the laptop being assigned to a business owner (and other user-defined attributes) above. The user interface can also implement a policy editor 32. The policy editor 32 can assist users in naming and authoring policies.

The policy editor 32 can also provide access to a policy template database stored on the data store 26 having template policies. A user can then create a specific policy instance using a preconfigured template by saving the policy instance as a policy. The policy editor 32, in one embodiment, also includes access to a script-based policy language that allows for highly flexible authoring of almost any type of desired policy. In addition, the policy editor 32 can be used to edit saved policies and policies from various preconfigured policy databases as well as author and edit policy templates.

In one embodiment, the policies that can be authored by the policy editor 32 are highly flexible. Such policies include technology-based policies, such as password length and firewall configurations. Furthermore, some policies can be process related, ensuring that certain process owners take certain actions. Yet other types of polices can include some that cannot be automatically enforced in an information technology sense. For example, risk assessment surveys must be manually filled out by someone responsible for the domain being surveyed, and a policy can include the requiring of such a survey being filled out periodically. Since such policies require at least some human interaction, they are sometimes referred to herein as "manual" policies.

The user interface 16 can also implement a policy manager 34. The policy manager 34 allows the user to organize and apply policies. Policies can be associated with controls that are designed to mitigate against specific threats, as defined in various standards, such as ISO-17799. In one embodiment, the policy manager can be used to identify threats, define (or import) controls, and associate policies to controls to implement the controls. One control may be implemented using several policies, and a policy may be occasionally used in multiple controls. In one embodiment, policies are applied directly to assets or groups of assets. The user interface 16 can also include a notification module 36 to send alerts and reports regarding compliance management and risk analysis.

Returning to referencing FIG. 1, the compliance management system 2 can also include a self-assessment module 28. The self-assessment module 28 maintains and accesses various self-assessment surveys that can be stored in data store 26. The self-assessment module 28 may periodically, or under the direction of the policy module 22 or the user interface 16, send surveys to various individuals for completion. The self-assessment module 28 can analyze the results of such surveys and provide feedback to various other parts of the system 2.

Virtual Asset Groups

Asset grouping is an important feature of a compliance management system. Controls are often directed at a group of assets, such as a site, an application or a network. These can also be regarded by the system as an asset, but each is further composed of other assets. For example, a site contains numerous users, systems, and so on; an application can be run on various servers and accessed by various clients; and a network contains numerous routers, printers, clients, and so on. Furthermore, policies implementing controls are also generally applied to a group of assets.

The conventional asset grouping functionality allows an administrator to create a group, and they drop all assets into the group. For example, if an administrator wanted to create an asset group including all computers running the Microsoft Windows operating system, the administrator would create a group (or folder) called, e.g., Windows OS, and associate all assets having the operating system attribute as "Windows" with the group. This method requires significant human interaction and planning, even when the assigning of the assets to the group is automated.

On embodiment of the present invention enables an administrator of a compliance management system to group assets faster, with less human interaction, and less chance of errors or oversights. Since the compliance environment is dynamic (with potentially millions of assets having changing attributes) and since audits generally have a narrow scope requiring immediate grouping of a large number of assets, the ability to quickly and reliably group assets is very important.

Figure 3:
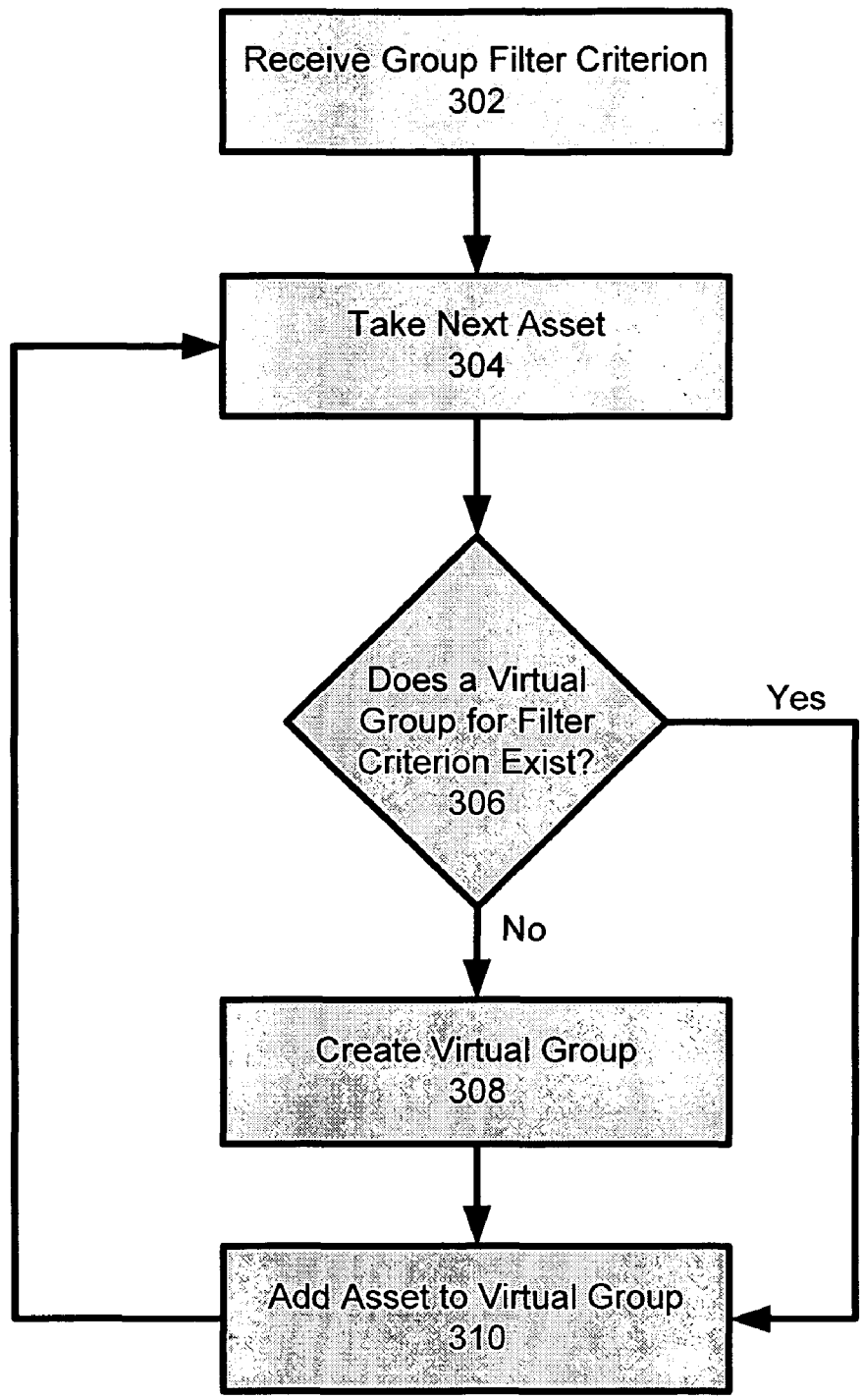
FIG. 3 is a flow diagram illustrating operation virtual group creation according to one embodiment of the present invention.

In one embodiment, the compliance management system implements "virtual" groups. The groups are virtual in the sense that no assets are actually moved or associated, the group is merely a fiction displayed to the administrator through a filter. Other administrators may view the same assets as belonging to different virtual groups. One embodiment for virtual group creation is now described with reference to FIG. 3.

In block 302, a group filter criterion is received. The group filter criterion can be received from the user interface. In one embodiment, the user interface allows the user to select the group filter criterion from a list of possible criteria, each associated with an asset attribute. Since asset attributes can vary by asset type, the list of possible criteria can be different based on asset type. When multiple asset types are under consideration, the user interface can add the attributes of the multiple asset types to create the list of possible criteria.

To use the example above, if an administrator wanted to group computer-type assets, one group filter criteria would be "operating system," since operating system is an asset attribute for this asset type. If the administrator wanted to group across asset types, a "location" criterion could be selected, since location is an attribute of several types of assets, including computers, users, applications, physical objects such as doors and alarms, and so on.

In block 304, virtual asset grouping based on the group filter criterion begins by taking the next asset (the first asset when the process begins), and continues to block 306 to a decision as to whether a virtual group for the filter criterion already exists (it will not for the first asset). In other words, in block 306 it is determined if there is a group already associated with the selected for attribute of the asset. For example, if the group filter criterion is "operating system," then, if the selected asset's operating system attribute is "Windows," then a determination is made as to whether there is already a Windows Operating System Virtual Group has been already created.

If in block 306 it is determined that a virtual group for the filter criterion does not yet exists, then, in block 308, a virtual group is created, and associated with the value of the asset's attribute for the group filter criterion. The asset is then added to the virtual group in block 310 using association or some other filtering technique. If, however, in block 306 it is determined that a virtual group for the filter criterion does already exists, then, processing proceeds directly to block 310, and the asset is added to the virtual group.

To return to the example above, if Windows Operating System Virtual Group has not yet been created (because the asset under consideration is the first being considered to run the Windows operating system), they the virtual group is created and the asset added to it. However, if another asset is already in a Windows Operating System Virtual Group, then the asset presently being considered is added to this virtual group. The processing continues at block 304 with the consideration of the next asset until all assets under consideration have been assigned to a virtual group.

This process eliminates the need for the administrator to manually create virtual groups, create or apply filters, or assign assets to groups, or investigate the kind of virtual groups needed or possible. For any set or subset of assets (including the set of all assets), the administrator is provided with a list of all possible group filter criteria (of course the interface is user-configurable if the administrator wishes to limit the amount of information displayed to him or her) selecting from which performs all the work of virtual group creation.

Dynamic Virtual Groups

The dynamic nature of the compliance environment creates many challenges for an effective compliance management system. Assets disappear, new assets appear, and asset attribute change constantly. In one embodiment, the virtual groups described above are dynamic to address the dynamic nature of the assets being monitored for compliance. One embodiment of the dynamic nature of the virtual groups is now described with reference to FIG. 4.

Figure 4:
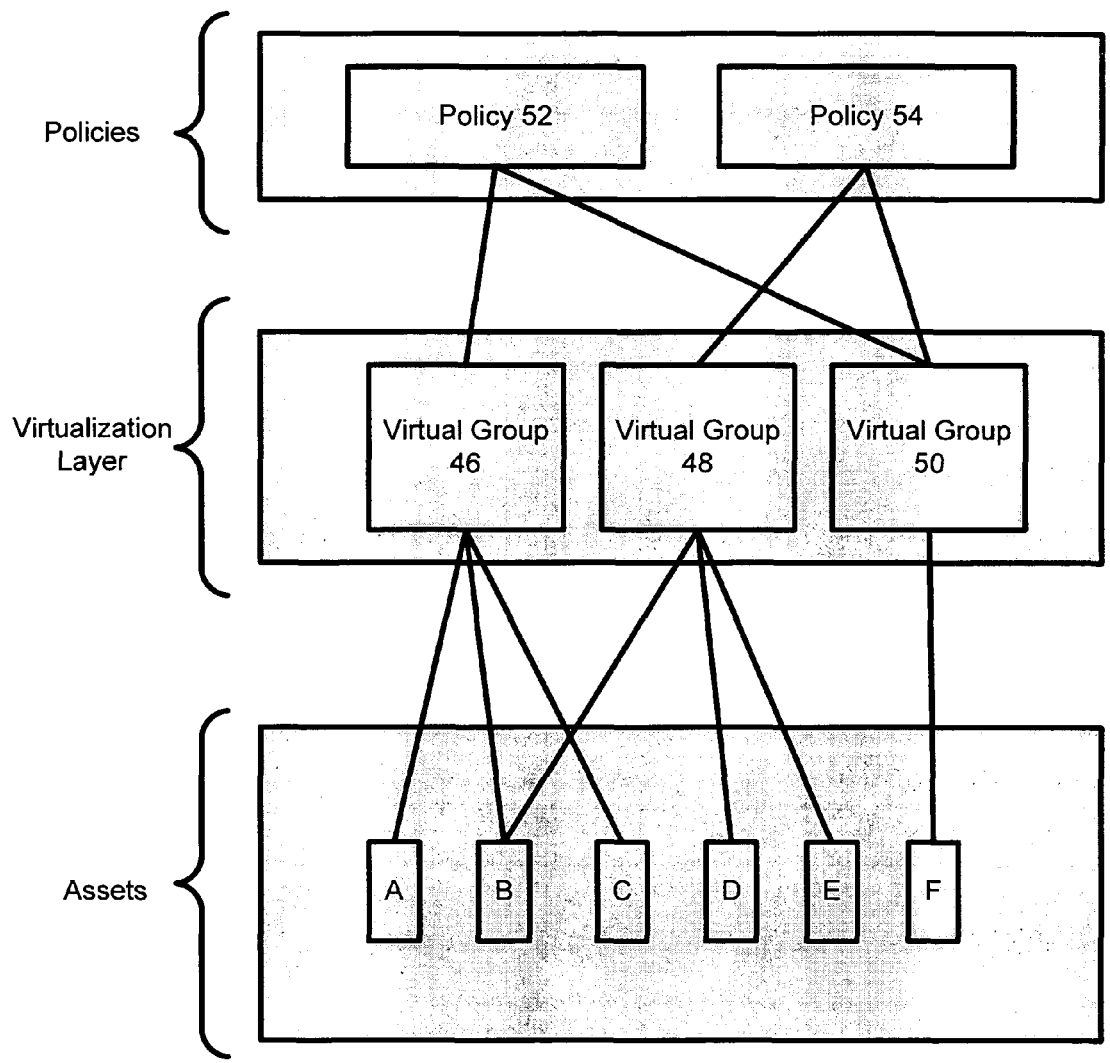
FIG. 4 is a block diagram illustrating a policy assignment using a virtualization layer according to one embodiment of the present invention.

FIG. 4 shows the assets 40 being monitored for policy compliance. For simplicity, only six assets are shown in FIG. 4, labeled A-F. To apply the policies 44 to the assets in a dynamic fashion, in one embodiment, the present invention implements a virtualization layer 42 including the virtual groups described above. For example, the administrator of the system can trigger virtual grouping of the assets 40 by some filter criteria, that results in the assets being grouped in either virtual group 46, virtual group 48, or virtual group 50.

In one embodiment, the creation of the virtual groups has no actual effect on the underlying assets; hence the term "virtual" group. However, the virtual group is displayed to the user as if it existed. At this point, the administrator can assign one or more policies to the virtual groups, using a graphical browser or console interface. Various graphical techniques may be used, such as checkboxes, drag-and-drop, or other association means.

For example, an administrator can apply policy 52 to virtual group 46, as illustrated in FIG. 4. Upon this assignment, the virtual group is created using the filtering procedure described with reference to FIG. 3. This process will identify asset A and asset C as belonging to virtual group 46. Then, in either the asset database, the policy database, or both, assets A and C will become associated with policy 52, which will from then on apply to these assets.

As is illustrated in FIG. 4, the same asset can belong to multiple virtual groups, a policy can be applied to multiple virtual groups, and a virtual group can have multiple policies applied to the asset contained in the virtual group. The virtualization layer 42 provides dynamic grouping functionality in two separate ways.

First, the appropriate policies are automatically applied to assets as they dynamically enter or change their attributes. For example, a laptop can belong to the "LAN" virtual group when at work, and the "VPN" virtual group when used from home via a virtual private network. Using network-type as the filter criterion to create virtual groups, different polices will apply to the same laptop as its attributes change over time. Similarly, a new asset that enters the network will be automatically placed in the correct virtual group at the next time a policy is applied that concerns the asset. Thus, using virtual groups automates many tasks required to maintain policy enforcement that is today performed manually.

Another way in which the virtualization layer 42 provides dynamic grouping functionality is by simplifying asset configuration and policy application. In one embodiment, the user interface displays the virtual groups to the system administrator graphically. Assets can also be represented graphically. In one embodiment, the user interface allows the administrator to drag-and-drop a graphical representation of an asset into a graphical representation of a virtual group.

In one embodiment, when the representation of the asset is "dropped" into a virtual group, the asset is first automatically reconfigured to fit the virtual group. In other words, if the asset has any attributes set inconsistently with the virtual group filter criteria, those attributes are automatically changed to be consistent with the virtual group filter criteria. For example, if a representation of a laptop belonging to the marketing group is dragged and dropped into a virtual group the accounting department, then the laptop configuration is automatically changed to indicate its association with the accounting department. Furthermore, because of the operation of the virtual groups as discussed above, all policies applied to the accounting virtual group will now automatically by applied to the laptop. This greatly simplifies and accelerates asset reconfiguration, and assures accuracy, since policy application happens automatically.

Example Computer System

Figure 5:
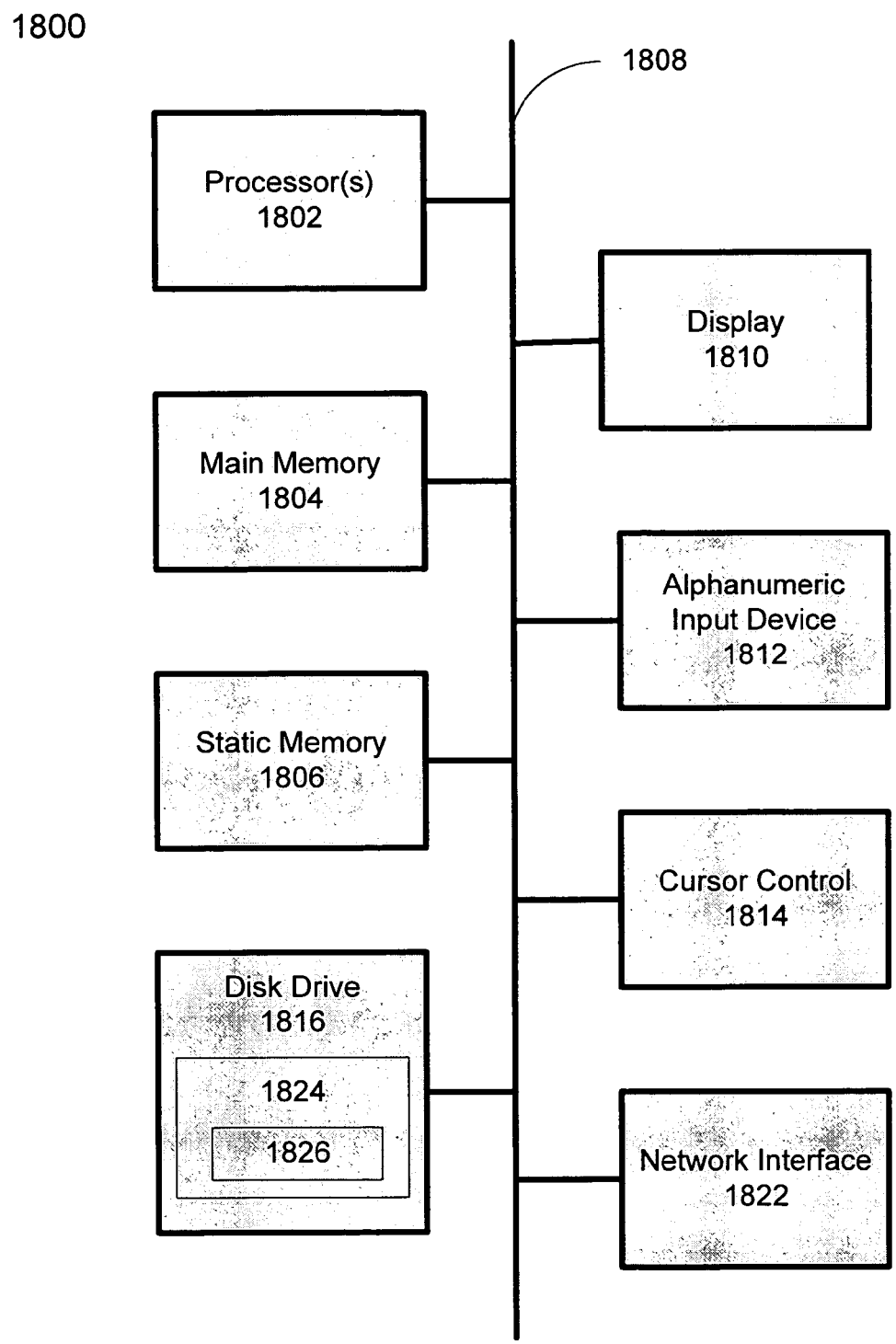
FIG. 5 is a block diagram illustrating an example computer system according to one embodiment of the present invention.

Various embodiments of the present invention have been described in the context of a server that performs compliance, security, and risk management functionalities, and a browser/console interface operable to access and view those functionalities. An example computer system on which such server and/or console interface can be implemented in now described with reference to FIG. 5. Numerous features described with reference to FIG. 5 can be omitted, e.g., a server will generally not include video display unit 1810. Computer system 1800 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 1800 includes a processor 1802, a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alpha-numeric input device 1812 (e.g., a keyboard), a cursor control device 1814 (e.g., a mouse), a disk drive unit 1816, and a network interface device 1822.

The disk drive unit 1816 includes a machine-readable medium 1824 on which is stored a set of instructions (i.e., software) 1826 embodying any one, or all, of the methodologies described above. The software 1826 is also shown to reside, completely or at least partially, within the main memory 1804 and/or within the processor 1802. The software 1826 may further be transmitted or received via the network interface device 1822. For the purposes of this specification, the term "machine-readable medium" shall be taken to include any medium that is capable of storing or encoding a sequence of instructions for execution by the computer and that cause the computer to perform any one of the methodologies of the present invention. The term "machine-readable medium" shall accordingly be taken to included, but not be limited to, solid-state memories, optical and magnetic disks, and carrier wave signals.

General Matters

In the description above, for the purposes of explanation, numerous specific details have been set forth. However, it is understood that embodiments of the invention may be practiced without these specific details. In other instances, well-known circuits, structures and techniques have not been shown in detail in order not to obscure the understanding of this description.

Embodiments of the present invention include various processes. The processes may be performed by hardware components or may be embodied in machine-executable instructions, which may be used to cause one or more processors programmed with the instructions to perform the processes. Alternatively, the processes may be performed by a combination of hardware and software.

Embodiments of the present invention may be provided as a computer program product that may include a machine-readable medium having stored thereon instructions, which may be used to program a computer (or other electronic device) to perform a process according to one or more embodiments of the present invention. The machine-readable medium may include, but is not limited to, floppy diskettes, optical disks, compact disc read-only memories (CD-ROMs), and magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer implemented method of automatically applying policies on a plurality of assets for allowing compliancy management of the assets in dynamic environments, comprising the steps of:

providing a compliance management system on a computing device, wherein said computing device is connected to a network comprising said assets for allowing said compliance management system to access said network;

discovering said assets of different asset types by said compliance management system using a plurality of distributed software interfaces over said network, wherein each discovered asset comprises one or more electrically available attributes;

automatically detecting one or more of said electrically available attributes of each of said discovered assets by said distributed software interfaces, wherein said distributed software interfaces report back said detected attributes to said compliance management system;

receiving a group filter criterion from a user through a user interface, wherein said received group filter criterion corresponds to one or more of said asset attributes;

grouping the discovered assets within one or more virtual asset groups by said compliance management system, if the virtual asset groups exist based on said received group filter criterion;

automatically creating the virtual asset groups by said compliance management system, if the virtual asset groups do not exist based on the received group filter criterion associated with said asset attribute, wherein the discovered assets are grouped within said automatically created virtual asset groups;

displaying the automatically created virtual asset groups to the user, wherein each of the virtual asset groups contain representations of the assets having the same asset attributes for the received group filter criterion;

allowing the user to associate one or more of the assets belonging to one or more virtual asset groups with one or more of the policies; and automatically applying one or more of said policies to said assets in said one or more virtual asset groups based on a dynamic change in said asset attributes;

whereby said automatic assigning of the policies on the virtual asset groups allow compliancy management of the assets in dynamic environments.

2. The computer implemented method of claim 1, further comprising allowing the user to manually configure one or more attribute of a single asset and a virtual asset group.

3. The computer implemented method of claim 2, wherein the manually configured attribute corresponds to the group filter criterion, and wherein displaying the plurality of virtual asset groups comprises displaying a representation of the manually configured asset in a different virtual asset group containing representations of assets having the same attributes as the manually configured attribute.

4. The computer implemented method of claim 1, further comprising providing a graphical interface to allow the user to drag a representation of an asset from a first virtual asset group of the plurality of virtual asset groups to a second virtual asset group of the plurality of virtual asset groups.

5. The computer implemented method of claim 4, wherein dragging the representation of the asset from the first virtual asset group to the second virtual asset group causes an automatic update of one or more asset attributes.

6. The computer implemented method of claim 1, wherein said different asset types of the discovered assets comprise computers, printers, routers, firewalls, operating systems, clients, users, applications, business processes, storage systems, data centers, and physical objects.

7. A computer implemented compliance management system for applying policies in dynamic environments, said compliance management system executed on a computing device connected to a network for accessing a plurality of assets, comprising:
a network interface module that connects said compliance management system to said assets accessible by said computing device through said network;
an asset module in communication with said network interface module to discover said assets using a plurality of distributed software interfaces over said network, each asset being configured as having one or more asset attributes, including one or more electrically accessible attributes, wherein said asset module enables a user of said computer implemented compliance management system to configure said asset attributes;
said distributed software interfaces to automatically detect one or more of said electrically available asset attributes of said discovered assets and automatically report said detected electrically available attributes to said asset module;
a user interface on said computing device to enable said user to input a group filter criterion associated with one or more of said asset attributes, and to display a plurality of virtual asset groups to the user, each virtual asset group containing representations of the assets having the same asset attributes for the received group filter criterion; and
a policy module for associating one or more assets with one or more of the policies, wherein the assets belong to one or more virtual asset groups and wherein said policy module automatically applies one or more of said policies to said assets in said one or more virtual asset groups based on a dynamic change in said asset attributes.

8. The computer implemented compliance management system of claim 7, wherein the user interface further allows the user to manually configure one or more attribute of one of the plurality of assets.

9. The computer implemented compliance management system of claim 8, wherein the manually configured attribute corresponds to the group filter criterion, and wherein the user interface displays the plurality of virtual asset groups by displaying a representation of the manually configured asset in a different virtual asset group containing representations of assets having the same attributes as the manually configured attribute.

10. The computer implemented compliance management system of claim 7, wherein the user interface is further to allow the user to associate one or more policies with one of the plurality of virtual asset groups.

11. The computer implemented compliance management system of claim 7, wherein the user interface provides a graphical interface to the user to allow the user to drag a representation of an asset from a first virtual asset group of the plurality of virtual asset groups to a second virtual asset group of the plurality of virtual asset groups.

12. The computer implemented compliance management system of claim 11, wherein dragging the representation of the asset from the first virtual asset group to the second virtual asset group causes the asset module to automatically update of one or more asset attributes.

13. The computer implemented compliance management system of claim 7, wherein said user interface displays associated virtual asset groups to the user, wherein each of said associated virtual asset groups contains a subset of the discovered assets and associated assets based on the received group filter criterion.

14. The computer implemented compliance management system of claim 7, wherein said policy module allows the user to associate one or more assets with one or more of the policies, wherein the assets belong to one or more virtual asset groups, further wherein the policies are automatically applied to the assets contained in the virtual asset groups in response to the user associating the policies with the virtual asset groups.

15. A non-transitory machine-readable medium having stored thereon data representing a plurality of computer parsable codes, when executed by a processor, cause the processor to perform operations comprising:
discovering a plurality of assets using a plurality of distributed software interfaces over a network, each asset being configured as having one or more electrically available asset attributes;
automatically detecting one or more of said electrically available attributes of each of said discovered assets by one or more distributed software interfaces, wherein said distributed software interfaces report back on said detected attributes to said compliance management system;
receiving a group filter criterion associated with an asset attribute from a user; and
displaying a plurality of virtual asset groups to the user, each virtual asset group containing representations of assets having the same asset attributes for the received group filter criterion;
allowing the user to associate one or more of the assets belonging to one or more virtual asset groups with one or more of the policies;
automatically applying one or more of said policies to said assets in said one or more virtual asset groups based on a dynamic change in said asset attributes.

16. The non-transitory machine-readable medium of claim 15, wherein the computer parsable codes further cause the processor to allow the user to manually configure one or more attribute of one of the plurality of assets.

17. The non-transitory machine-readable medium of claim 16, wherein the manually configured attribute corresponds to the group filter criterion, wherein displaying the plurality of virtual asset groups comprises displaying a representation of the manually configured asset in a different virtual asset group containing representations of assets having the same attributes as the manually configured attribute.

18. The non-transitory machine-readable medium of claim 15, wherein the computer parsable codes further cause the processor to allow the user to associate one or more policies with one of the plurality of virtual asset groups.

19. The non-transitory machine-readable medium of claim 18, wherein the one or more policies associated with the virtual asset group are automatically applied to the assets contained in the virtual asset group in response to the user associating the one or more policies with the virtual asset group.

20. The non-transitory machine-readable medium of claim 15, wherein the computer parsable codes further cause the processor to provide a graphical interface to allow the user to drag a representation of an asset from a first virtual asset group of the plurality of virtual asset groups to a second virtual asset group of the plurality of virtual asset groups.

21. The non-transitory machine-readable medium of claim 20, wherein dragging the representation of the asset from the first virtual asset group to the second virtual asset group causes an automatic update of one or more asset attributes.

22. A computer implemented method of automatically applying policies to a plurality of assets for allowing compliancy management of the assets in dynamic environments, comprising the steps of:

providing a compliance management system on a computing device connected to a network, wherein said assets are connected to said network;

discovering said assets of different asset types by said compliance management system using a plurality of distributed software interfaces over said network, wherein each discovered asset comprises one or more electrically available attributes;

receiving a group filter criterion from a user through a user interface, wherein said received group filter criterion corresponds to one of said electrically available asset attributes;

grouping the discovered assets within one or more virtual asset groups by said compliance management system, if the virtual asset groups exist based on said received group filter criterion;

automatically creating the virtual asset groups by said compliance management system, if the virtual asset groups do not exist based on the received group filter criterion associated with said asset attribute, further wherein the discovered assets are grouped within said automatically created virtual asset groups;

displaying the automatically created virtual asset groups to the user, wherein each of the virtual asset groups contain representations of the assets having the same attributes for the received group filter criterion; and associating one or more of the assets belonging to one or more virtual asset groups with one or more of the policies; and automatically applying one or more of said policies to said assets in said one or more virtual asset groups based on a dynamic change in said asset attributes;

whereby said automatic assigning of the policies on the virtual asset groups allow compliancy management of the assets in dynamic environments.

\* \* \* \* \*